United States Patent
Ming

(10) Patent No.: US 9,232,108 B2
(45) Date of Patent: Jan. 5, 2016

(54) PRINT MANAGEMENT IN PRINT-ON-DEMAND JOBS

(71) Applicant: KONICA MINOLTA LABORATORY U.S.A., INC., San Mateo, CA (US)

(72) Inventor: Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/041,026

(22) Filed: Sep. 30, 2013

(65) Prior Publication Data

US 2015/0092247 A1   Apr. 2, 2015

(51) Int. Cl.
*H04N 1/40* (2006.01)
*H04N 1/32* (2006.01)
*H04N 1/00* (2006.01)

(52) U.S. Cl.
CPC ....... *H04N 1/32144* (2013.01); *H04N 1/00326* (2013.01); *H04N 2201/3269* (2013.01); *H04N 2201/3271* (2013.01)

(58) Field of Classification Search
CPC ..... G06F 3/1204; G06F 3/126; G06F 3/1253; G06F 3/1259; G06F 21/608; G06F 3/1232; G06F 3/1244; G06F 3/1208; G06F 3/1272; G06F 3/1222; G06F 3/1238; G06F 3/1256; G06F 3/1275; G06F 3/1229; G06F 21/31; G06K 15/027; G06K 15/1822; H04N 2201/0094; H04N 1/00957; H04N 1/00204; H04N 1/00973; H04N 2201/3212

USPC ............... 358/1.15, 1.9, 1.13, 1.16, 504, 501; 347/14, 19; 726/4, 28
See application file for complete search history.

(56) References Cited

U.S. PATENT DOCUMENTS

| | | | |
|---|---|---|---|
| 5,444,779 A * | 8/1995 | Daniele | 399/366 |
| 7,882,559 B2 * | 2/2011 | Imai | 726/21 |
| 8,127,341 B2 * | 2/2012 | Tamura | 726/4 |
| 2002/0178952 A1 * | 12/2002 | Sainio et al. | 101/485 |
| 2010/0328703 A1 * | 12/2010 | Cain | 358/1.15 |

\* cited by examiner

*Primary Examiner* — Thomas D Lee
*Assistant Examiner* — Stephen M Brinich
(74) *Attorney, Agent, or Firm* — Chen Yoshimura LLP

(57) ABSTRACT

A method for managing reproduction of a print generation of a document, where a machine-readable pattern of the original print has been previously generated and printed on the original print and containing document registration and management information of the original print. The method includes the steps of receiving a print-on-demand (POD) job order for producing a reprint of the original print, retrieving document registration information and print management information from the machine-readable pattern, authenticating the original print based on the document registration information, verifying reprint permission based on the print management information, generating a new machine-readable pattern for the reprint, maintaining a master machine-readable pattern on a digital form of the document or a data file for the document with updated information of the reprint, and completing the POD job order by producing the reprint with the new machine-readable pattern.

20 Claims, 5 Drawing Sheets

PRINT MANAGEMENT IN PRINT-ON-DEMAND JOBS

BACKGROUND OF THE INVENTION

1. Field of the Invention

This invention relates to print management in print-on-demand (POD) jobs, and in particular, it relates to utilizing barcodes or any machine-readable pattern in print management in POD jobs.

2. Description of Related Art

Many POD jobs involve reprinting or copying of a document that has been printed before in hard copies on a recording medium, often referred to as "print". In this sense, a print is a hard copy print out of a digital document on a recording medium, such as paper. Reprinting of a print generally means to print the digital document again on a recording medium by, for example, a printer device. Copying of a print, on the other hand, generally means to scan the print and print the scanned image on a recording medium by, for example, a copier device. Printer and copier devices are often referred to as image reproduction devices. Sometimes an image reproduction device may be an "all-in-one" device that combines the functions of a printer, a scanner, a copier and/or a facsimile machine.

Due to concerns of document reproduction rights such as copyrights, various approaches have been developed to control the printing of digital documents and also the reproduction, e.g., reprinting or copying, of printed documents (or prints). One of the approaches is to utilize barcodes that are printed on the prints.

Barcode is a form of machine-readable symbology for encoding data, and has been widely introduced in a variety of application fields. Two-dimensional barcode (2D barcode) is one mode of such symbology. It can be used to encode text, numbers, images, and binary data streams in general, and has been used in identification of documents, etc. Examples of widely used 2D barcode standards include PDF417 standard and Quick Response Code or QR Code®, and software and hardware products have been available to print and read such 2D barcodes.

As mentioned above, original digital documents, which may include text, graphics, images, etc., are often printed in prints, and the printed hard copy or prints are distributed, copied, etc., and then often scanned back into digital form. This is referred to as a "closed-loop" process. Alternatively, an original digital document that has been printed in prints in certain quantity at an earlier time may need to be reprinted for another certain quantity at a later time. There is often a need to authenticate a print and verify the authorization for reprint.

Various methods have been proposed to authenticate a print using 2D barcode. Specifically, the method includes encoding the content of the document in a 2D barcode (i.e., the "authentication barcode"), and printing the barcode on the same recording medium as the printed document. The content of the document may be a bitmap image of a page of the document, text, graphics or images contained within the document, or a mixture thereof. To authenticate a print bearing an authentication barcode, the print can be scanned to obtain scanned data that represents the content of the document, e.g. a bitmap image, text extracted by using an optical character recognition (OCR) technology, etc. The authentication barcode is also scanned and the data contained therein (i.e., the authentication data) is extracted. The scanned data of the print is then compared to the authentication data to determine whether the document is authentic. A printed document bearing authentication barcode is said to be self-authenticating because no information other than what is on the printed document is required to authenticate its content. In self-authentication cases, print management may only be used in a very limited manner, i.e., to allow or not to allow printing, because the number of reprints cannot be controlled.

It is desirable to provide a method that utilizes 2D barcodes to assist the authentication and verification of the rights of reprinting or copying prints in POD jobs in an effective and efficient manner.

SUMMARY

The present invention is directed to a method of print management in POD jobs.

An object of the present invention is to provide a method for print management in POD jobs that utilizes machine-readable patterns such as 2D barcodes which include not only authentication and verification information of the prints but also management and user information of the prints, such that information of the original print and all subsequent reprints are retained in an effective and efficient manner.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for managing reproduction of an original print of a document, where a machine-readable pattern of the original print has been previously generated and printed on the original print and containing document registration and management information of the original print. The method includes the steps of receiving a print-on-demand (POD) job order for producing a reprint of the original print, retrieving document registration information and print management information from the machine-readable pattern, authenticating the original print based on the document registration information, verifying reprint permission based on the print management information, generating a new machine-readable pattern for the reprint, maintaining a master machine-readable pattern on the digital form of document on server or alternatively a data file for the document with updated information of the reprint, and completing the POD job order by producing the reprint with the new machine-readable pattern.

In another aspect, the present invention provides a non-transitory computer readable recording medium having a computer readable program code embedded therein for controlling a data processing apparatus, the computer readable program code configured to cause the data processing apparatus to execute the process of the above method.

In a further aspect, the present invention provides a system configured to cause a data processing apparatus to execute the process of the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
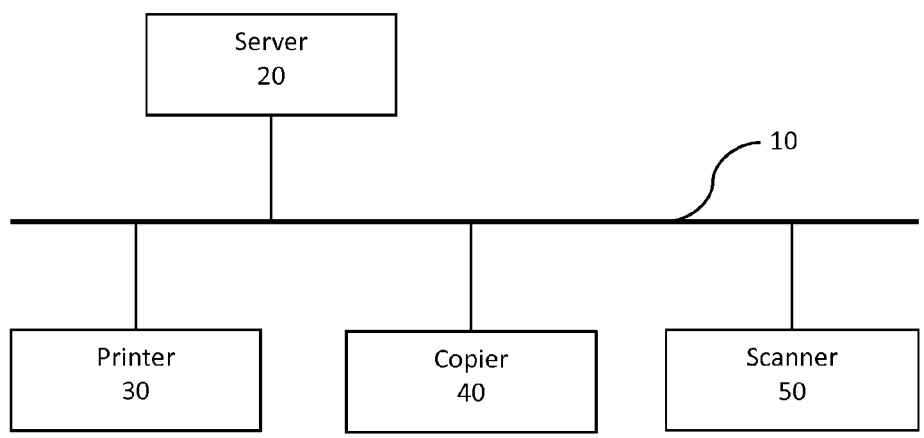
FIG. 1 is a schematic block diagram illustrating an exemplary arrangement according to one of the embodiments of the present invention.

Embodiments of the present invention provide a method of print management in POD jobs. Referring to FIG. 1, there is shown schematic block diagram illustrating an exemplary arrangement according to one of the embodiments of the present invention. As shown in FIG. 1, connected to a network 10 such as the Internet or other communication links, there are a computer server 20, a printer 30, a copier 40, a scanner 50, and other data processing apparatus (not shown). The server 20 may be used to control and operate the printer 30, copier 40 and/or scanner 50, or the printer 30, copier 40 and scanner 50 may be independently controlled and operated. The server 20 may be used to provide digital documents that are to be printed by the printer 30, or receive digital documents scanned by the scanner 40. Such digital documents may be locally stored in and/or retrieved from internal or external data storage devices of the server 20, or remotely stored in and/or retrieved from, via the network 10, third party server(s) and/or file repositories that can be accessed online by server 20.

For example, when an original digital document is to be printed out on a recording medium, such as paper, as a print, the original digital document may be locally stored in and/or retrieved from internal or external data storage devices of the server, or remotely stored in and/or retrieved from, via the network 10, third party server(s) and/or file repositories. Server 20 then sends the digital document to printer 30, and printer 30 prints out the document on a sheet or sheets of paper as a print. At the time the print is produced, server 20 or printer 30 can generate a machine-readable pattern such as a 2D barcode digitally, and print the 2D barcode on one or more sheets of paper on which the document is printed, or on a separate sheet of paper that is regarded as part of the print and is to be distributed together with the print. The digital barcode generated for the print will be saved by server 20 for future references.

As part of the document authenticity verification and digital rights management (DRM) process, when a reproduction of an original print is to be produced, either by reprinting another print from the digital document file with printer 30 or by copying the original print with copier 40, the authenticity of the original print and rights for reproduction of the original print may need to be verified with the help of the 2D barcode printed on the original print. The 2D barcode may be scanned by the scanner 50 or captured by other image capturing device such as a camera. The captured image of the 2D barcode may then be analyzed by scanner 50 or server 20 to decode authentication and rights information of the original print. If the original print is authentic and rights for reproduction exist, then another print may be printed by printer 30 from the original digital document file, or a copy may be made by copier 40 from the original print.

Figure 2:
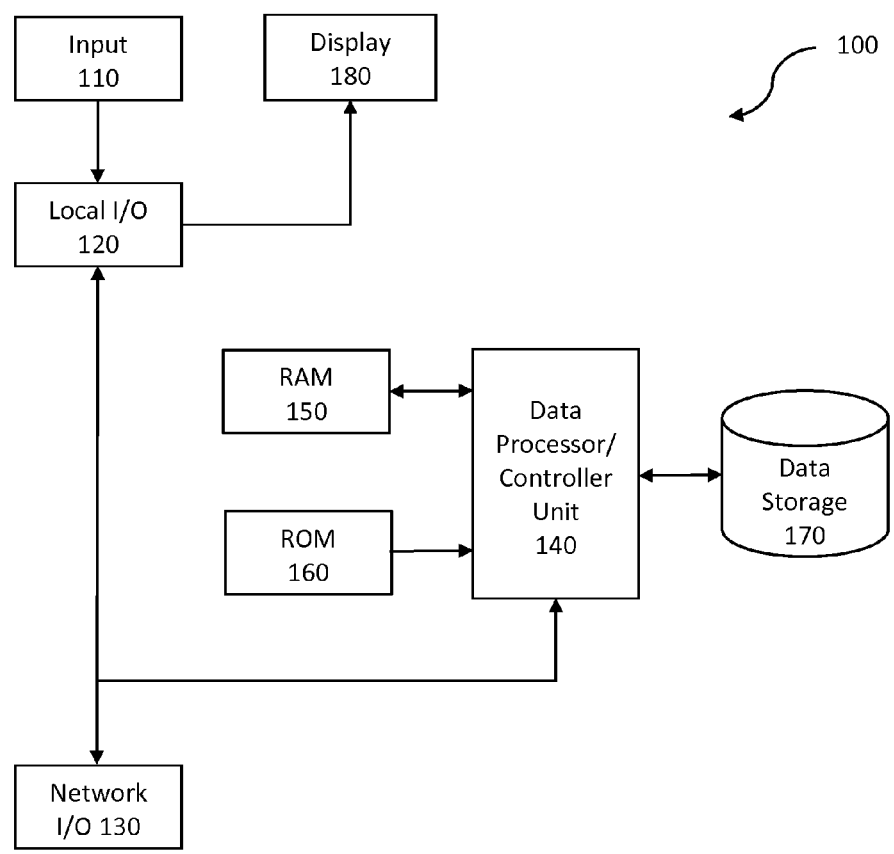
FIG. 2 is a schematic block diagram illustrating an exemplary data processing apparatus such as a computer or server having a data processing unit according to one of the embodiments of the present invention.

Referring to FIG. 2, there is shown a schematic block diagram illustrating an exemplary computer or server 100, whereupon various embodiments of the present invention may be implemented. The server 100 typically includes a user input device 110 including, for example, a keyboard and a mouse. The input device 110 may be connected to the server 100 through a local input/output (I/O) port 120 to enable an operator and/or user to interact with the server 110. The local I/O 120 is also provided for local connections via direct links to other electronic devices such as a file storage, a monitor and/or a printer. The server 100 typically also has a network I/O port 130 for connection to a computer network such as the Internet, so that the server 100 may remotely communicate with the other servers connected to the computer network.

The server 100 typically has a data processor/controller unit 140 such as a central processor unit (CPU) that controls the functions and operations of the server 100. The data processor/controller unit 140 is connected to various memory devices such as a random access memory (RAM) device 150, a read only memory (ROM) device 160, and a storage device 170 such as a hard disc drive or solid state memory. The storage device 170 may be an internal memory device or an external memory device such as a file storage device.

The computer software program codes and instructions for implementing the various embodiments of the present invention may be installed or saved on one or more of these memory devices. The data processor/controller unit 140 executes these computer software programs and instructions to perform the functions and carry out the operations to implement the process steps of the various embodiments of the present invention.

The server 100 typically also includes a display device 180 such as a video monitor or display screen which may be connected to the local I/O 120. The input device 110 and the display device 180 together provide a user interface (UI) which allows a user to interact with the server 100 to perform the steps of the process according to the various embodiments of the present invention.

The input device 110 and the display device 180 may be integrated into one unit, such as a touch screen display unit, to provide a more easy and convenient UI for user interaction with the server 100.

It is understood that the server 100 may be any suitable computer or computer system. Preferably for use, for example, by an online service provider, the server 100 is a webstore server. However, for use by a member of the general public, the server 100 may be a desktop computer, a laptop computer, a notebook computer, a netbook computer, a tablet computer, a hand-held portable computer or electronic device, a smart phone, or any suitable data processing apparatus that has suitable data processing capabilities.

Figure 3:
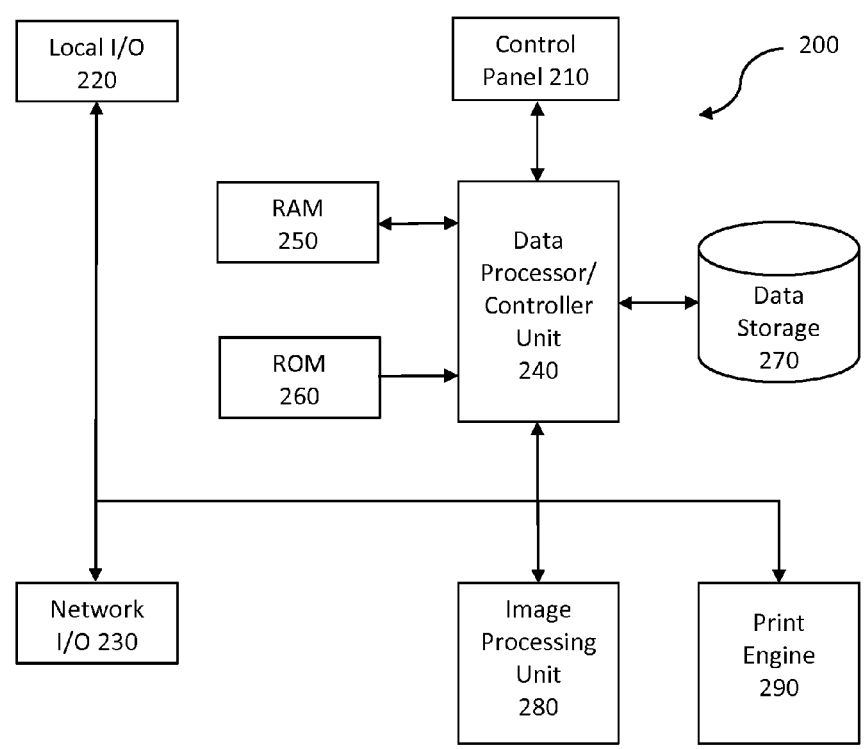
FIG. 3 is a schematic block diagram illustrating an exemplary data processing apparatus such as a printer or copier having a data processor or controller unit according to the embodiment of the present invention.

Referring to FIG. 3, there is shown a schematic block diagram illustrating another exemplary data processing apparatus embodied in a document reproduction device such as a printer or copier 200, whereupon various embodiments of the present invention may also be implemented.

The printer or copier 200 typically includes an integrated control panel 210 which includes a keypad and a display screen, or a touch screen that provides both the input and display functions.

The printer or copier 200 may has a local I/O port 220 for connection with other local devices such as a computer. The printer or copier 200 typically also has a network I/O port 230 for connection to a network such as the Internet so that the printer or copier 200 may remotely communicate with the other computers and servers connected to the Internet.

The printer or copier 200 typically has a data processor/controller unit 240 that controls the functions and operations of the printer or copier 200. The data processor/controller unit 240 is connected to various memory devices such as a RAM device 250, a ROM device 260, and a storage device 270 such as a hard disc drive or solid state memory.

The storage device 270 may be an internal memory device or an external memory device such as a hard disc drive. The computer software programs and instructions for implementing the various embodiments of the present invention may be installed or saved on one or more of these memory devices.

The data processor/controller unit 240 executes these computer software programs and instructions to perform the functions and carry out the operations to implement the process steps of the various embodiments of the present invention.

It is understood that the data processing apparatus 200 may be any suitable document reproduction device or system, such as a printer, a copier, a scanner, a facsimile machine, an all-in-one printer, a printing system, or any suitable document reproduction device that has suitable data processing capabilities.

In the exemplary embodiments of the present invention method, the print management functions and document authentication functions are conducted in the same workflow. The document registration information encoded in the machine-readable patterns such as 2D barcodes is expanded to encompass both document authentication information and print management information. So that the 2D barcode will encode document/image content information, digest of original image content information and management information, document registration information, user identification (ID) information, reproduction permission information, customer POD job order information, etc.

Comparing to typical document authentication barcodes, the expanded barcode utilized in the embodiments of the present invention method will include dynamic customer order and reprint information that is updated each time a reprint is made. For example, the barcode for a first original print of a document may indicate that it is the original print made at a certain date and time under a user's certain POD job number and that three more reprint is permitted, and the barcode for a reprint of the same document may indicate that it is the second print made at another date and time under the user's another POD job number and that only two more reprint can be made. The mater barcode on the digital form of document on server may include original registration information; maximum allowed prints or reprints, and the remaining allowed print or reprints. And optionally all the print history like date, time, user ID, etc. can be included if barcode size is not a concern. So for each reprint of the same document, the barcode is updated and recreated, which means that there is no one fixed barcode for a given document.

It is noted that the first original print is the one issued from the POD server directly. However, sometimes the server may issue original print multiple times, there are multiple original prints. In these situations, since there are multiple original prints, the barcode on each one of the original prints may be different from the master barcode on the digital form of the document, which is the very original document, on server.

Of course the easiest way to manage prints/reprints of a document is to keep on a server all digital files of the various prints/reprints of the document, or keep all barcodes of the various prints/reprints of the document. However, this approach may not be an efficient use of the server resources, and may cause confusion as one document may have multiple digital "replicas" or modified barcodes stored on server, especially when the number of prints/reprints is increasing.

In one exemplary embodiment of the present invention, the approach taken is to keep only the latest/updated management information in master barcode for each document on the server. In this case, the digital form of the original document on server, the original print of a document and the reprints of the document will have different barcodes. The barcode of the original print will carry, among others, document contents information, registration information, reproduction rights information, etc. In order to be able to authenticate document contents and manage reprint, the barcodes for the reprints of the same document will carry the digest of original barcode or original registration for authentication purpose, as well as updated reproduction information.

In a reprint or copying process, the reprint permission will be first verified. If there is permission for reprint or copying, then the document authenticity will be verified with at least the digest of the document contents. Other print management information, for example available number of reprints, will also be verified. If everything is alright, then the management information will be updated with the current reprint or copying order information, and the server will update master barcode on server, recalculate and generated the barcode for the reprint or copy. Since the original image content information can be extracted from the existing barcodes, the most time consuming process of extracting content information from the document itself (to generate barcode) is avoided, which saves processing time and improves the efficiency of using server resources.

Figure 4:
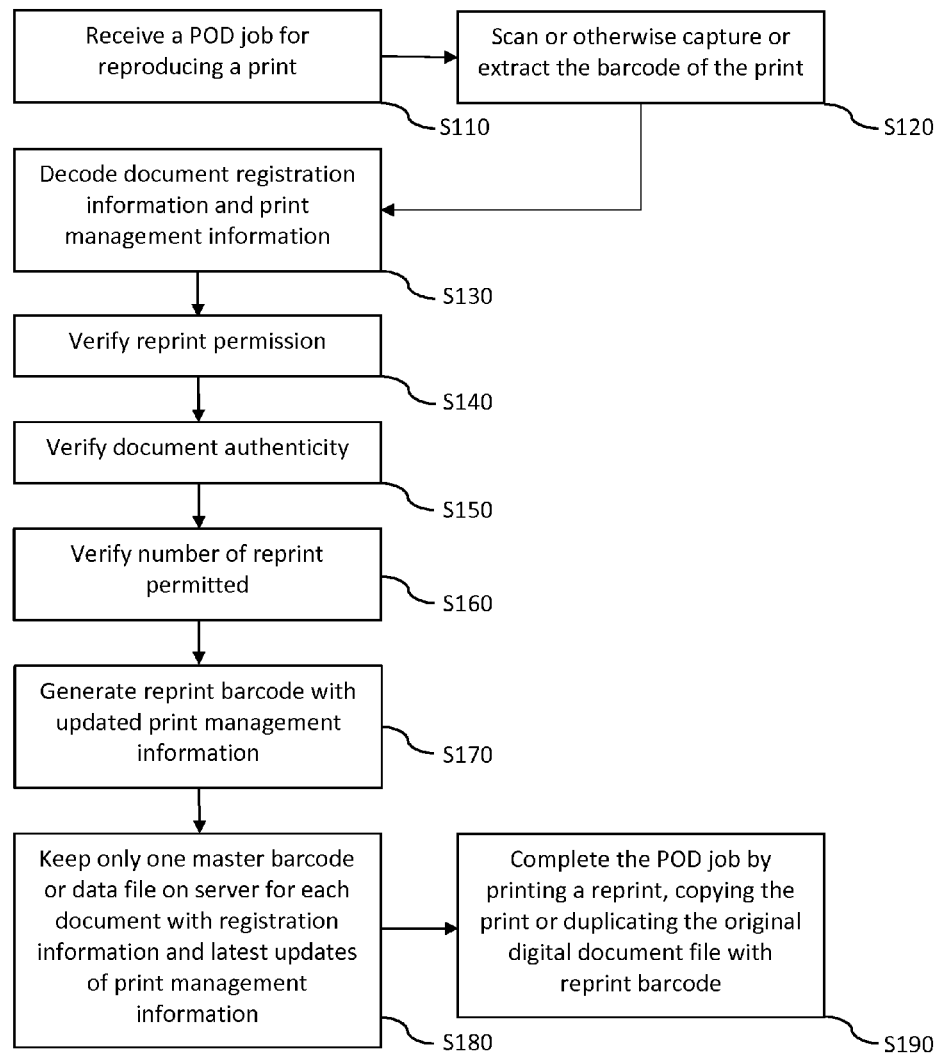
FIG. 4 is a flow chart diagram illustrating an exemplary process according to one of the embodiments of the present invention.

Referring to FIG. 4, there is shown a flow chart diagram illustrating an exemplary process in accordance with to one of the embodiments of the present invention. At Step S110, a POD order is received for reproducing (reprint or copy) an original print of a document, where a machine-readable pattern such as a barcode of the original print has been previously generated and printed on the original print, containing document registration and management information of the original print.

Particularly, the barcode of the original print may be encoded (with or without encryption) to include both document registration information and print management information. The document registration information includes, for example, document ID information, original document/image content information, etc. The print management information includes, for example, original print job information (such as print job ticket), rights/protection information (such as reprint permission), user information (such as user ID), etc. The user information may be used for verifying if a reprint is authorized or not for a particular user.

The information encoded in the barcode printed on the original print may also include a digest of the document registration information which is derived or calculated from the document registration information, and a digest of the print management information which is derived or calculated from the print management information. By using a digest, the barcode can be much smaller or shorter because, e.g., the digest may be cryptographic hash functions, such as MD5 or SHA-1, with fixed data length.

In addition, corresponding to the barcode printed on the original print, the server also maintains a master barcode, or alternatively a digital data file, on the server which contains both document registration information and print management information of the original print. The information contained in the master barcode or the data file maintained by the server preferably matches the information encoded in the barcode printed on the first original print.

For reproducing a document that has been published and distributed in electronic form, such as a digital portable document format (PDF) file, its digital barcode may have been generated and attached or affixed to the file electronically as, for example, an image object.

At Step S120, the barcode printed on the original print is scanned by a scanner or otherwise captured, for example, by a camera. For a digital file with a digital barcode, the barcode can be electronically extracted.

At Step 130, the scanned, captured or extracted barcode is decoded to obtain document registration information and print management information of the original print. Any suitable coding scheme may be used.

At Step S140, the reprint permission of the document will be first verified. The reprint permission is contained in the print management information decoded from the barcode.

If reprint permission exists, then at Step S150 the authenticity of the document is verified. This can be done by processing the document content information decoded form the barcode. If a digest of the document registration information exists, then the authenticity verification may be based on the digest of the document registration information.

If the document authenticity is verified, then at Step 160 print management information, such as available number of reprints information, user ID, etc., will also be verified. Verification of the user ID, for example, may reveal whether the owner of the print, or the customer of reprint POD job, matches the user ID contained in the user information encoded in the original barcode.

If reprint is not permitted, then no legitimate reprint will be made or produced. There are number of ways to prevent unauthorized copying of an original print. For example, an "invisible" watermark may be added in printing an original print, such that when an unauthorized copying is made to the original print, the watermark will become visible. Printer steganography is another alternative. Another example is to use a special ink for printing a document, such that when an unauthorized copying of the document is made, the contents of the document will disappear due to heating or lighting.

At Step 170, if all verification processes of the previous steps are passed, then a reprint barcode will be generated for the reprint with updated print management information. The new barcode will be encoded with the same document registration information, and/or the same digest of the document registration information, as the original barcode. The print management information and/or the digest of print management information encoded in the reprint barcode will be based on the print management information and/or the digest of print management information of the original barcode, but with updated information of the reprint, such as POD job history information, print/reprint operation history information, information on number of remaining reprints permitted, current reprint job order information, reprint job ticket, reprint user/customer ID, etc. Preferably, to keep the barcode compact, the POD job and print/reprint operation history information may be kept in the master barcode maintained on the server, but excluded from the print out barcode.

At Step S180, the master barcode or the digital data file maintained on the server is updated with new print management information that preferably matches the updated information of the reprint encoded in the reprint barcode. This means that no new master barcode is generated, or no new data file is added, but only one master barcode or data file for each document is kept on the server with the latest updates of print management information.

At Step S190, the reproduction will be made with the reprint barcode. The reproduction may be a reprint from printing the original digital document by a printer, a copy from copying the original print by a copier, or duplicating the original digital document file as a digital "reprint" file for new publication or distribution. The reprint barcode for the reprint or copy of the original print may be printed on the reprint or copy. The reprint barcode for the digital "reprint" file may be a digital image object attached or affixed to the digital "reprint" file.

In an alternative exemplary embodiment of the present invention, the approach taken is to keep only the original registration information in the barcodes for the print and reprints, and the latest print information for reprints of each document, and to keep master barcode unchanged, but maintain a data file associated with the document on the server to record all the changes of management information.

Figure 5:
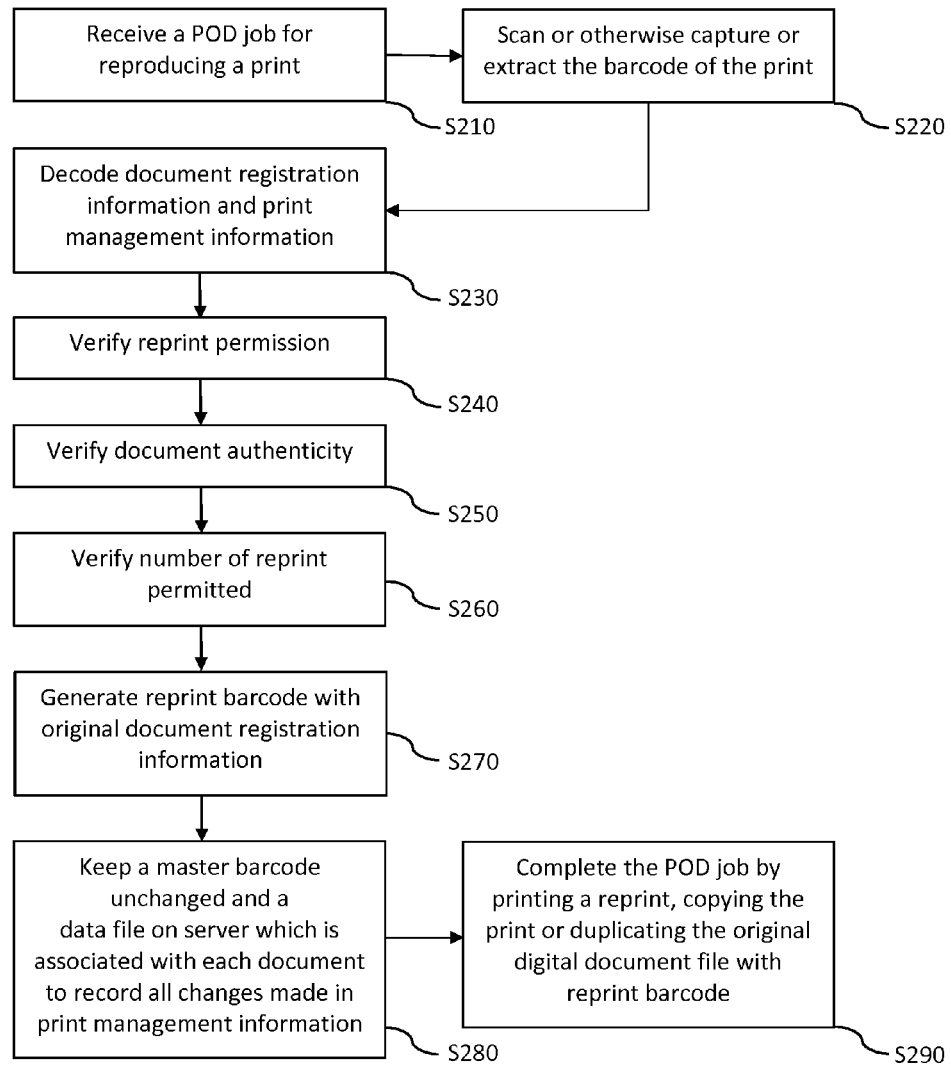
FIG. 5 is a flow chart diagram illustrating another exemplary process according to one of the embodiments of the present invention.

Referring to FIG. 5, there is shown a flow chart diagram illustrating another exemplary process according to one of the embodiments of the present invention. This process takes a similar but alternative approach as compared to the process described above in conjunction with FIG. 4, in that in this alternative approach, not the latest (the most recent) document registration and print management information are saved on the server; rather only the original registration is kept in the machine-readable pattern such as a barcode for each document, and a data file is kept on the server which is associated with the document to record all the changes made in the print management information. The barcode on prints may be similarly generated as described above.

As shown in FIG. 5, the alternative process begins at Step S210, where a POD order is received for reproducing (reprint or copy) an original print of a document, where a barcode of the original print has been previously generated and printed on the original print, containing document registration and management information of the original print. As mentioned earlier, the document registration information includes, for example, document ID information, original document/image content information, etc. The print management information includes, for example, original print job information (such print job ticket), rights/protection information (such as reprint permission), user information (such as user ID), etc. The user information may be used for verifying if a reprint is authorized or not for a particular user.

The barcode printed on the original print may also include a digest of the document registration information which is derived or calculated from the document registration information, and a digest of the print management information which is derived or calculated from the print management information.

At Step S220, the barcode printed on the original print is scanned by a scanner or otherwise captured, for example, by a camera. For a digital file with a digital barcode, the barcode can be electronically extracted.

At Step 230, the scanned, captured or extracted barcode is decoded to obtain document registration information and print management information of the original print. Any suitable coding scheme may be used.

At Step S240, the reprint permission of the document will be first verified. The reprint permission is contained in the print management information decoded from the barcode. If reprint permission exists, then at Step S250 the authenticity of the document is verified. This can be done by processing the document content information decoded form the barcode. If a digest of the document registration information exists, then the authenticity verification may be based on the digest of the document registration information. If the document authenticity is verified, then at Step 260 print management information, such as available number of reprints information, user ID, etc., will also be verified.

At Step 270, if all verification processes of the previous steps are passed, then a reprint barcode will be generated for the reprint with original document registration information. The new reprint barcode will be encoded with original document registration information, and/or a digest of the original document registration information. The reprint barcode will also be encoded with updated print management information and/or the digest of updated print management information.

At Step S280, the master barcode remains unchanged, while a digital data file is kept on the server which is associated with each document to record all changes made in print management information of the document.

At Step S290, the reproduction will be made with the reprint barcode. Again, the reproduction may be a reprint from printing the original digital document by a printer, a copy from copying the original print by a copier, or duplicating the original digital document file as a digital "reprint" file for new publication or distribution. The reprint barcode for the reprint or copy of the original print may be printed on the reprint or copy. The reprint barcode for the digital "reprint" file may be a digital image object attached or affixed to the digital "reprint" file.

Although in many instances the exemplary embodiments of the invention is implemented in a print-scan loop, it is understood that computers, printers and/or scanners can each individually function to perform certain part of the exemplary process of the process of the invention. For example, a computer may be used to generate/encode and/or decode a barcode, a printer may be used generate and/or print a barcode, while a scanner or a camera may be used to read and/or decode a barcode. From a practical application viewpoint, it is not necessary to have all of the devices connected in a network or connected to each other. Furthermore, multifunction printers (MFP) and All-In-One (AIO) devices may also be used in place of the printer or scanner for generating/capturing barcodes.

Therefore in the above described aspect, the invention may be embodied in a data processing system including computers/servers and printers/copiers or scanners/cameras. Yet still in another aspect, the invention may also be embodied in a computer program product embodied in computer usable non-transitory medium having a computer readable program code embedded therein for controlling a data processing apparatus to carry out the process of the invention as described above.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for managing reproduction of an original print of a document, where a machine-readable pattern of the original print has been previously generated and printed on the original print and containing document registration and management information of the original print, the method comprising:

receiving a print-on-demand (POD) job order for producing a reprint of the original print;

retrieving document registration information and print management information from the machine-readable pattern;

authenticating the original print based on the document registration information;

verifying reprint permission based on the print management information;

generating a new machine-readable pattern for the reprint;

maintaining a master machine-readable pattern on a digital form of the document to encode updated information of the reprint, wherein data encoded in the new machine-readable pattern for the reprint is a subset of data encoded in the master machine-readable pattern on the digital form of the document; and completing the POD job order by producing the reprint with the new machine-readable pattern.

2. The method of claim 1, wherein the retrieving step further comprises a step of scanning the machine-readable pattern with a scanner.

3. The method of claim 1, further comprising a step of determining a number of reprints allowed from the print management information.

4. The method of claim 1, wherein the step of generating the new machine-readable pattern further comprising a step of encoding the new machine-readable pattern with updated print management information.

5. The method of claim 4, wherein the master machine-readable pattern encodes only latest update of the print management information.

6. The method of claim 1, wherein the step of generating the new machine-readable pattern further comprising a step of encoding the new machine-readable pattern with the registration information of the original print.

7. The method of claim 6, wherein the master machine-readable pattern records all changes made in the print management information.

8. The method of claim 1, wherein the reprint is produced by printing the reprint with a printer.

9. The method of claim 1, wherein the reprint is produced by copying the original print with a copier.

10. The method of claim 1, wherein the reprint is produced by reproducing the document in a digital file with a computer.

11. A non-transitory computer readable recording medium having a computer readable program code embedded therein for controlling a data processing apparatus, the computer readable program code configured to cause the data processing apparatus to execute a process for managing reproduction of an original print of a document, where a machine-readable pattern of the original print has been previously generated and printed on the original print and containing document registration and management information of the original print, the process comprising:

receiving a print-on-demand (POD) job order for producing a reprint of the original print;

retrieving document registration information and print management information from the machine-readable pattern;

authenticating the original print based on the document registration information;

verifying reprint permission based on the print management information;

generating a new machine-readable pattern for the reprint;

maintaining a master machine-readable pattern on a digital form of the document to encode updated information of the reprint, wherein data encoded in the new machine-readable pattern for the reprint is a subset of data encoded in the master machine-readable pattern on the digital form of the document; and completing the POD job order by producing the reprint with the new machine-readable pattern.

12. The non-transitory computer readable recording medium of claim 11, wherein the retrieving step further comprises a step of scanning the machine-readable pattern with a scanner.

13. The non-transitory computer readable recording medium of claim 11, further comprising a step of determining a number of reprints allowed from the print management information.

14. The non-transitory computer readable recording medium of claim 11, wherein the step of generating the new machine-readable pattern further comprising a step of encoding the new machine-readable pattern with updated print management information.

15. The non-transitory computer readable recording medium of claim 14, wherein the master machine-readable pattern encodes only latest update of the print management information.

16. The non-transitory computer readable recording medium of claim 11, wherein the step of generating the new machine-readable pattern further comprising a step of encoding the new machine-readable pattern with the registration information of the original print.

17. The non-transitory computer readable recording medium of claim 16, wherein the master machine-readable pattern records all changes made in the print management information.

18. The non-transitory computer readable recording medium of claim 11, wherein the reprint is produced by printing the reprint with a printer.

19. The non-transitory computer readable recording medium of claim 11, wherein the reprint is produced by copying the original print with a copier.

20. The non-transitory computer readable recording medium of claim 11, wherein the reprint is produced by reproducing the document in a digital file with a computer.

\* \* \* \* \*